United States Patent [19]

Sjödin

[11] Patent Number: 5,777,401

[45] Date of Patent: Jul. 7, 1998

[54] CIRCUITRY FOR REDUCTION OF THE MAGNETIC FIELD IN THE VICINITY OF MULTIPHASE POWER LINES

[75] Inventor: Jan-Olov Sjödin, Vällingby, Sweden

[73] Assignee: Vattenfall AB (Publ.), Stockholm, Sweden

[21] Appl. No.: 750,963

[22] PCT Filed: Apr. 17, 1996

[86] PCT No.: PCT/SE96/00493

§ 371 Date: Dec. 20, 1996

§ 102(e) Date: Dec. 20, 1996

[87] PCT Pub. No.: WO96/33541

PCT Pub. Date: Oct. 24, 1996

[30] Foreign Application Priority Data

Apr. 21, 1995 [SE] Sweden ................................ 9501473

[51] Int. Cl.$^6$ ............................................. H02G 7/20
[52] U.S. Cl. ........................... 307/91; 307/90; 307/104; 333/12; 174/32; 174/35 R
[58] Field of Search ......................... 307/89–91, 104; 333/12; 336/84, 83; 174/32, 34, 36, 40 R, 43, 35 R, 35 MS; 361/107, 143, 146; 315/85

[56] References Cited

U.S. PATENT DOCUMENTS

| | | | |
|---|---|---|---|
| 1,872,575 | 8/1932 | Halperin et al. | 307/89 |
| 2,075,965 | 4/1937 | Traves | 307/89 |
| 2,280,950 | 4/1942 | Harder | 307/90 |
| 3,674,933 | 7/1972 | Baum et al. | 307/90 |
| 3,963,975 | 6/1976 | Gauper, Jr. et l. | 307/91 |
| 5,068,543 | 11/1991 | Ohkawa | 307/91 |
| 5,175,442 | 12/1992 | Ashley | 307/91 |
| 5,218,507 | 6/1993 | Ashley | 307/91 |
| 5,515,230 | 5/1996 | Ashley | 307/91 |
| 5,536,978 | 7/1996 | Cooper et al. | 307/90 |
| 5,616,969 | 4/1997 | Morava | 307/91 |

FOREIGN PATENT DOCUMENTS

| | | |
|---|---|---|
| 501657 | 4/1995 | Sweden . |
| WO95/20835 | 8/1995 | WIPO . |

*Primary Examiner*—Brian Sircus
*Assistant Examiner*—Peter Ganjian
*Attorney, Agent, or Firm*—Jacobson, Price, Holman & Stern PLLC

[57] ABSTRACT

A circuitry (1) for reducing the magnetic field from multiphase power lines for high voltage alternating current is disclosed. One phase (R) is split into two branches (R1, R2) forming a closed loop along a line portion (L). The self-reactance of the loop is adjusted for minimal magnetic field generation in the vicinity of the power line by a coupling to a compensation device, in the form of a capacitor (12), in a separate circuit (11), via a transformer (2).

10 Claims, 1 Drawing Sheet

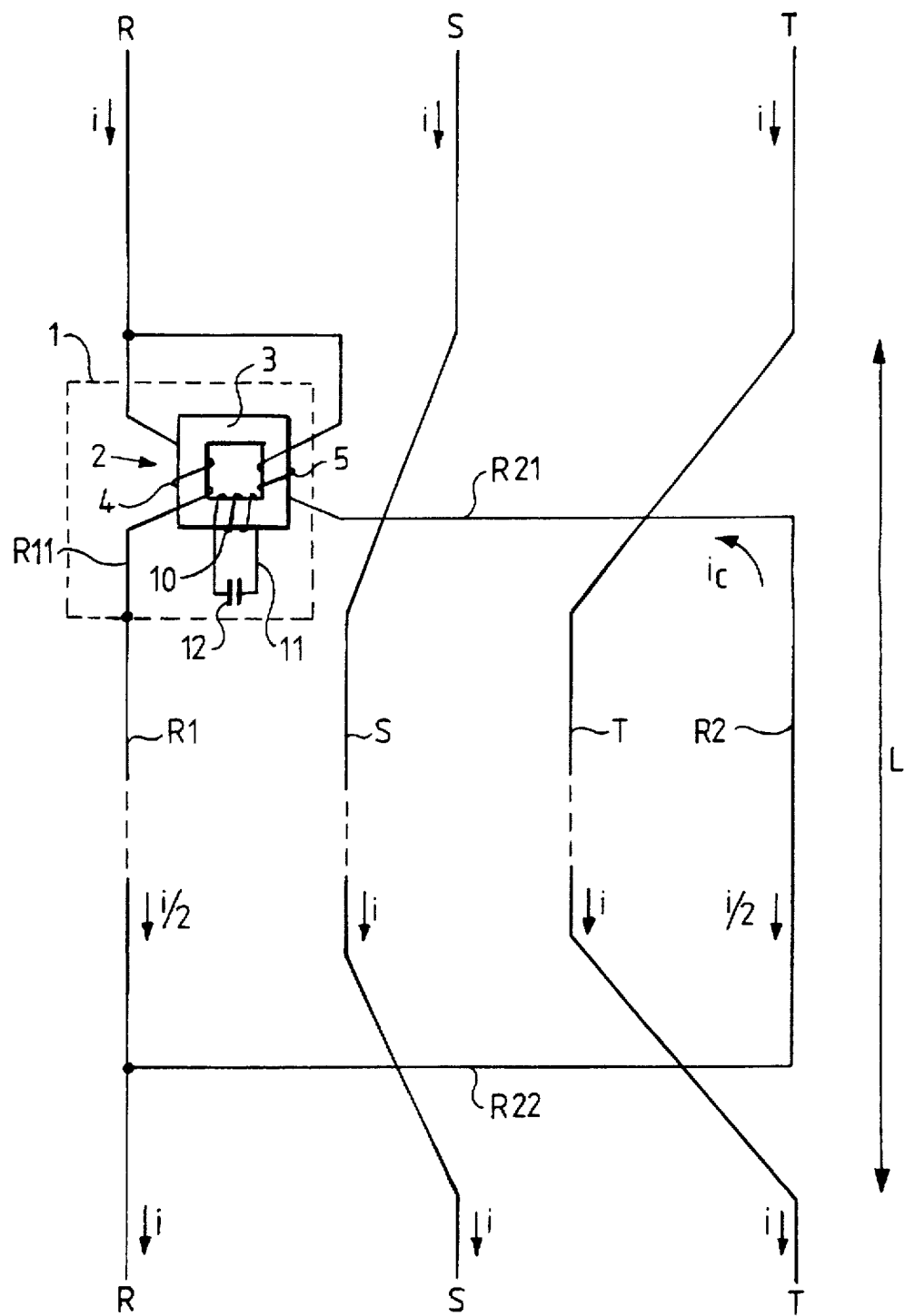

5,777,401

CIRCUITRY FOR REDUCTION OF THE MAGNETIC FIELD IN THE VICINITY OF MULTIPHASE POWER LINES

BACKGROUND OF THE INVENTION

1. Field of the Invention

The invention relates to circuitry designed to reduce the magnetic field in the vicinity of a multiphase power line for transferring electrical current, wherein at least one of the phases is split into two branches for the transfer of a respective partial phase current and forming along a line portion a closed loop, in which a circulating current is induced so as to reduce the magnetic field, at least one compensation device being coupled to said closed loop for adjusting the self-reactance of the closed loop in such a way that the magnetic field is minimized in the vicinity of the power line.

2. Description of the Related Art

Such a circuitry is disclosed in WO 95/20835 (Vattenfall AB), wherein capacitive elements, for example capacitors, are directly connected in the closed loop as a compensation device.

In comparison with conventional three-phase arrangements, such a circuitry will reduce the magnetic field to approximately one sixth, wherein the phase split provides a reduction of one third and the compensation device provides a further fifty percent reduction.

However, such compensation devices being directly connected to the closed loop must be dimensioned in such a way that they can carry the primary partial phase current as well as the induced circulating current. Therefore, the capacitors must be dimensioned for transferring 70–100% of the phase current in a three-phase arrangement.

Furthermore, the availability of the power line is lowered because of the risk of failure of any of the capacitors.

SUMMARY OF THE INVENTION

With this background, the object of the present invention is to provide, in a circuitry of the kind stated in the first paragraph, an improved compensation device which may be dimensioned for substantially smaller currents and which does not affect the availability of the power line.

According to the invention, this object is achieved in that the compensation device is included in a separate circuit which is coupled to the closed loop via a transformer designed to transfer said circulating current, but not said partial phase currents, to the compensation device. By such an indirect coupling of the compensation device, the latter may be made much smaller and lighter, e.g. in the form of a filter, in particular comprising a capacitor. A possible short-cut or a cut-off in the separate circuit does not affect the power transfer as such, but only the reduction of the magnetic field. Thus, the availability of the power line will not be affected.

These advantages will very well balance the complication involved in adding a transformer.

Preferably, the two branches of the closed loop will include mutually opposite windings on a transformer core of the transformer, the core being coupled to the separate circuit by means of a third winding. This third winding may comprise a substantially smaller cable than the two phase branch conductors, in particular in case the opposite windings are dimensioned so that the excitation in the transformer core, originating from the primary partial phase currents, will be negligible. Thus, the transformer will only transfer the circulating current, induced in the closed loop, to the separate circuit and the associated compensation device. The various components included therein may therefore be dimensioned for smaller currents.

Preferably, the dimensions are such that the induced circulating current in the closed loop will be 15% to 25% of the respective phase current in a three-phase arrangement, whereby a total reduction of the magnetic field to about one sixth may be obtained, like in the previously known circuitry, as compared to a conventional power line with three-phase conductors.

At power lines supported in the air, the circuitry, i.e. the transformer and the associated separate circuit and the compensation device, may likewise be suspended above the ground.

BRIEF DESCRIPTION OF THE DRAWINGS

The invention will be explained more fully below in conjunction with a preferred embodiment with reference to the appended drawing.

The drawing shows schematically an arrangement with three-phase conductors and a circuitry according to the present invention.

DESCRIPTION OF THE PREFERRED EMBODIMENT

At the top and at the bottom of the drawing, there are three-phase conductors R, S, T, which in the illustrated embodiment are assumed to form a power line for the transfer of a high voltage (e.g. 220 kV) three-phase alternating current.

The phase conductors are suspended in parallel to each other at like mutual spacing in line poles, e.g. of portal-type with two poles and a transverse member, as described in the above-mentioned WO 95/20835. Along a line portion L, a phase conductor R is split into two parallel branches R1 and R2. The line portion L corresponds to a number of normal segments between a pair of poles, for example 1 to 10.

The parallel branches R1, R2 are connected to a closed loop by means of transverse conductors, in the form of slacks R21, R22, the closed loop being thus elongated in the longitudinal direction of the power line along the line portion L.

Each of the phase conductors S and T will transfer one (i) of the three-phase currents, whereas the external phase branch conductors R1 and R2 will each transfer one half (i/2) of the third phase current (i) flowing through the phase conductor R. By such phase splitting, the magnetic field (on the ground in the vicinity of the power line) will be reduced to about one third.

A further magnetic field reduction will be provided by the fact that the unsymmetrical conductor arrangement along the line portion L will generate an induced circulating current $i_c$, which will be superposed on the primary partial currents i/2 in the closed loop R1, R11, R21, R2, R22. The magnitude of this circulating current $i_c$ will depend partly on the induction, which in turn depends on the geometrical configuration, partly on the self-reactance of the closed loop.

By an optimal adjustment of the self-reactance of the closed loop, the magnetic field may be reduced to a minimum, in particular by a further 50%, i.e. to a total of one sixth of the magnetic field obtained by a conventional three-phase conductor arrangement.

According to the present invention, this further magnetic field reduction will be provided by means of a circuitry 1 comprising a transformer 2, by means of which the closed loop R1, R11, R21, R2, R22 will be coupled to a separate circuit 11 including a compensation device, in particular comprising a capacitor 12.

The transformer 2 has a closed ferromagnetic core 3. A portion (R11) of the phase branch conductor R1 forms a first winding 4, and a portion of the phase branch conductor R2, viz. the transverse connection conductor R21, forms a second winding 5. The windings 4, 5 are oriented in such a way, viz. in opposite directions in relation to the core 3, that the parallel partial currents i/2 will generate oppositely directed excitations in the core 3. In case the numbers of windings are the same in the two windings 4 and 5, the two partial currents i/2, being of the same magnitude, will give rise to a negligible excitation and will thus not provide any inductive coupling to the third winding 10 included in the separate circuit 11.

However, the circulating current $i_c$ will bring about two cooperating excitation contributions via the windings 4 and 5, so an inductive coupling will be provided via the winding 10 to the separate circuit 11 and the capacitor 12. Accordingly, the self-reactance of the closed loop will depend on the capacitance of the capacitor 12, and the capacitor may therefore be used as a compensation device, irrespective of the partial phase currents i/2 flowing in parallel to each other.

In the illustrated example, it is assumed that the whole circuitry 1 and the transverse conductor R21 are suspended in one and the same line pole at the end of the line portion L, whereas the transverse conductor R22 is suspended and has a slack conductor in another line pole at the other end of the line portion L.

A number of modifications may be carried out by those skilled in the art in relation to the illustrated embodiment.

The power line may include more phases than three, and it does not necessarily have to be mounted in the open air.

Possibly, the closed transformer core 3 may be tubular in order to obtain a lower weight and smaller losses. However, the transformer should be dimensioned so as to withstand currents appearing in case of lightning and failures and to be protected against transient high voltages.

In principle, the capacitor 12 may be replaced by some other circuit component or component combination which will bring about a corresponding change in the self-reactance of the separate circuit 11 and, consequently, the self-reactance of the closed loop R1, R11, R21, R2, R22.

I claim:

1. Circuitry for reducing the magnetic field in the vicinity of a multiphase power line for the transfer of alternating electrical current, wherein at least one of the phases is split into two branches, each transferring a partial phase current and forming along a line portion a closed loop in an unsymmetrical arrangement which induces a circulating current so as to reduce the magnetic field and to which a compensation device is coupled for adjusting the self-reactance of the closed loop in such a way that the magnetic field in the vicinity of the power line is minimized, characterized in that the compensation device is included in a separate circuit, which is coupled to said closed loop via a transformer designed to substantially transfer said circulating current but not said partial phase currents to said compensation device.

2. Circuitry as defined in claim 1, characterized in that the two branches of the closed loop comprise oppositely oriented windings around a transformer core of the transformer, said transformer core being coupled to said separate circuit via a third winding.

3. Circuitry as defined in claim 2, characterized in that said oppositely oriented windings are dimensioned such that the excitation in the transformer core, originating from said partial phase currents, will be negligible.

4. Circuitry as defined in claim 3, characterized in that the dimensions are such that the induced circulating current in the closed loop will constitute about 15% to 25% of the respective phase current in a three-phase arrangement.

5. Circuitry as defined in claim 1, characterized in that the compensation device comprises a filter.

6. Circuitry as defined in claim 5, wherein the filter comprises at least one capacitor.

7. Circuitry as defined in claim 1, wherein the power line is suspended above the ground by line poles and comprises at least four, substantially parallel and mutually spaced phase conductors, at least two of which are constituted by said branches, characterized in that said transformer and the associated separate circuit and said compensation device are likewise suspended above the ground.

8. Circuitry as defined in claim 7, characterized in that a portion of each of the branches including said windings is formed by a slack conductor.

9. Circuitry as defined in claim 8, wherein the power line comprises four phase conductors, wherein two outer phase conductors constitute said branches in said closed loop, whereas two inner, unsplit phase conductors are disposed at uniform spacing inside the two outer phase conductors in a substantially straight arrangement, characterized in that said transformer and the associated separate circuit and the compensation device are suspended at a line pole carrying each slack conductor, at least one of the slack conductors forming a transverse connecting conductor.

10. Circuitry as defined in claim 9, characterized in that each slack conductor are provided at one end of said closed loop, one of the slack conductors is a transverse connecting conductor, whereas the other slack conductor is suspended at two adjacent suspension points at the line pole.

\* \* \* \* \*